United States Patent
Pan et al.

(10) Patent No.: US 9,547,398 B2
(45) Date of Patent: Jan. 17, 2017

(54) SUBSTRATE WITH TOUCH FUNCTION AND DISPLAY USING THE SAME

(71) Applicant: AU OPTRONICS CORP., Hsin-Chu (TW)

(72) Inventors: Hsin-Yu Pan, Hsin-Chu (TW); Chung-Min Lien, Hsin-Chu (TW); Han-Ming Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 2 days.

(21) Appl. No.: 14/456,331

(22) Filed: Aug. 11, 2014

(65) Prior Publication Data

US 2015/0062076 A1 Mar. 5, 2015

(30) Foreign Application Priority Data

Aug. 28, 2013 (TW) .............................. 102130880 A

(51) Int. Cl.
*G06F 3/045* (2006.01)
*G06F 3/044* (2006.01)
(Continued)

(52) U.S. Cl.
CPC .............. *G06F 3/044* (2013.01); *G06F 3/042* (2013.01); *G06F 3/0412* (2013.01);
(Continued)

(58) Field of Classification Search
CPC ........ G06F 3/042; G06F 3/044; G06F 3/0304; G06F 3/0412; G06F 2203/4106; G09G 3/3696; G09G 2319/0264
(Continued)

(56) References Cited

U.S. PATENT DOCUMENTS 8,436,835 B2    5/2013  Liu et al.
8,823,683 B2 *  9/2014  Chung .................. G06F 3/0412
                                                        178/18.09
(Continued)

FOREIGN PATENT DOCUMENTS

CN    101655644    2/2010
CN    102495699    6/2012
(Continued)

OTHER PUBLICATIONS

Taiwan Patent Office, "Office Action", Mar. 25, 2015.
China Patent Office, "Office Action," Sep. 1, 2015.

*Primary Examiner* — Prabodh M Dharia
(74) *Attorney, Agent, or Firm* — WPAT, PC; Justin King

(57) ABSTRACT

A substrate with touch function includes a plurality of scan lines and at least a touch device disposed thereon. The touch device includes at least a power line, at least a readout line, a light sensing circuit and a voltage divider circuit. The power line and the readout line are disposed on the substrate. The light sensing circuit is electrically coupled to a (N+1)th of the power lines, an Nth of the scan lines and an Nth of the readout lines, wherein N is an integer. The voltage divider circuit has an output terminal and is configured to output a first voltage to the light sensing circuit through the output terminal thereof according to a degree of illumination thereon or a degree of capacitance change. A display using the aforementioned substrate is also provided.

15 Claims, 7 Drawing Sheets

(51) Int. Cl.
*G09G 3/36* (2006.01)
*G06F 3/042* (2006.01)
*G06F 3/041* (2006.01)

(52) U.S. Cl.
CPC . *G09G 3/3696* (2013.01); *G06F 2203/04106* (2013.01); *G09G 2310/0264* (2013.01)

(58) Field of Classification Search
USPC ........ 345/76, 107, 156–184; 257/40, 43, 57, 257/59, 66; 178/18.06; 349/200
See application file for complete search history.

(56) References Cited

U.S. PATENT DOCUMENTS

| | | | | |
|---|---|---|---|---|
| 2008/0084366 | A1* | 4/2008 | Saito | G06F 3/0421 345/76 |
| 2008/0100566 | A1* | 5/2008 | Miyasaka | G09G 3/3446 345/107 |
| 2008/0198140 | A1* | 8/2008 | Kinoshita | G06F 3/042 345/173 |
| 2009/0027423 | A1* | 1/2009 | Kwon | G09G 3/3233 345/690 |
| 2010/0026636 | A1* | 2/2010 | Jang | G02F 1/13338 345/173 |
| 2011/0149185 | A1* | 6/2011 | Yamazaki | H01L 27/1225 349/39 |
| 2011/0157097 | A1* | 6/2011 | Hamada | G02F 1/13338 345/175 |
| 2011/0175895 | A1* | 7/2011 | Hayakawa | G09G 3/3655 345/212 |
| 2011/0242044 | A1* | 10/2011 | Liu | G06F 3/0416 345/174 |
| 2011/0254808 | A1* | 10/2011 | Lin | G02F 1/167 345/175 |
| 2012/0001864 | A1* | 1/2012 | Liu | G06F 3/0412 345/174 |
| 2012/0049193 | A1* | 3/2012 | Saito | G02F 1/13454 257/59 |
| 2012/0113055 | A1* | 5/2012 | Liu | G06F 3/0412 345/175 |
| 2012/0146936 | A1* | 6/2012 | Liu | G09G 3/3648 345/174 |
| 2012/0249454 | A1* | 10/2012 | Teraguchi | G06F 3/0412 345/173 |
| 2013/0100077 | A1 | 4/2013 | Chung et al. | |
| 2013/0222756 | A1* | 8/2013 | Van Heugten | G02B 5/1876 349/200 |
| 2013/0306946 | A1* | 11/2013 | Chang | H01L 27/323 257/40 |
| 2014/0092076 | A1* | 4/2014 | Lee | G09G 3/3291 345/212 |
| 2014/0098064 | A1 | 4/2014 | Lien et al. | |
| 2014/0139492 | A1 | 5/2014 | Liu et al. | |
| 2014/0175432 | A1* | 6/2014 | Yamazaki | H01L 27/1248 257/43 |
| 2014/0293167 | A1* | 10/2014 | Yamazaki | H01L 27/1225 349/12 |
| 2014/0313138 | A1* | 10/2014 | Jeong | G09G 3/3258 345/173 |
| 2015/0193045 | A1* | 7/2015 | Zhou | G09G 3/3233 345/174 |
| 2015/0301338 | A1* | 10/2015 | Van Heugten | G02C 7/04 345/8 |

FOREIGN PATENT DOCUMENTS

| | | |
|---|---|---|
| CN | 103123554 | 5/2013 |
| CN | 103218085 | 7/2013 |
| TW | 201220148 | 5/2012 |
| TW | I425494 | 11/2012 |

* cited by examiner

SUBSTRATE WITH TOUCH FUNCTION AND DISPLAY USING THE SAME

TECHNICAL FIELD

The present disclosure relates to a touch control field, and more particularly to a substrate with touch function and a display employing the aforementioned substrate.

BACKGROUND

With the development of technology, flat display panels (such as liquid crystal displays, organic light emitting diode displays and plasma displays etc.,) have been widely used in a variety of consumer electronics products (such as mobile phones, notebook computers, desktop displays and televisions etc.,) due to the features of high quality, small size, light weight and wide range of applications, etc. In addition, flat display panels also have gradually replaced the traditional cathode ray tube (CRT) display devices and become the mainstream of display devices.

Moreover, with being implemented with touch function, flat panel displays with touch function are further capable of providing a human-computer interaction interface, which make users have more intuitive experiences.

Today's light sensing touch panel usually employ a light sensing circuit to detect whether there is a touch object (for example, a light pen or finger) or not. Specifically, the light sensing circuit is configured to detect a touch event by the degree of leakage current, which is generated and corresponding to the illumination thereon; wherein a working window, resulted by the degree of the leakage current and related to the material characteristics of amorphous silicon, is an important factor for the determination of a touch event.

However, if having a too small working window, a light sensing circuit may be too much sensitive to a variety of environmental factors (such as voltage or temperature) and accordingly may generate a wrong determination about whether there has a touch event or not.

SUMMARY

One aspect of the present disclosure provides a substrate with touch function capable of determining touch objects more accurately.

Another aspect of the present disclosure provides a display using the aforementioned substrate.

An embodiment of the disclosure provides a substrate with touch function, which includes a plurality of scan lines and at least a touch device. The scan lines and the touch device are disposed on the substrate. The touch device includes at least a power line, at least a readout line, a light sensing circuit and a voltage divider circuit. The power line and the readout line are disposed on the substrate. The light sensing circuit is electrically coupled to a (N+1)th of the power lines, an Nth of the scan lines and an Nth of the readout lines, wherein N is an integer. The voltage divider circuit has an output terminal and is configured to output a first voltage to the light sensing circuit through the output terminal thereof according to a degree of illumination thereon or a degree of capacitance change.

Another embodiment of the disclosure provides a display with touch function, which includes a first substrate, a second substrate and a liquid crystal layer. The first substrate includes a plurality of scan lines and at least a touch device. The scan lines and the touch device are disposed on a first side of the first substrate. The touch device includes at least a power line, at least a readout line, a light sensing circuit and a voltage divider circuit. The power line and the readout line are disposed on the substrate. The light sensing circuit is electrically coupled to a (N+1)th of the power lines, an Nth of the scan lines and an Nth of the readout lines, wherein N is an integer. The voltage divider circuit has an output terminal and is configured to output a first voltage to the light sensing circuit through the output terminal thereof according to a degree of illumination thereon or a degree of capacitance change. The second substrate is disposed on a second side of the first substrate. The liquid crystal layer is disposed between the first substrate and the second substrate.

In summary, by employing a voltage divider circuit on a substrate of a display with touch function, electrically coupling the voltage divider circuit with a light sensing circuit and configuring the voltage divider circuit to output a first voltage to the light sensing circuit according the degree of illumination thereon or a degree of associated capacitance change, the light sensing circuit has a larger working window. Consequentially, the substrate and the display employing the aforementioned substrate can determine whether there has a touch event or not more accurately.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
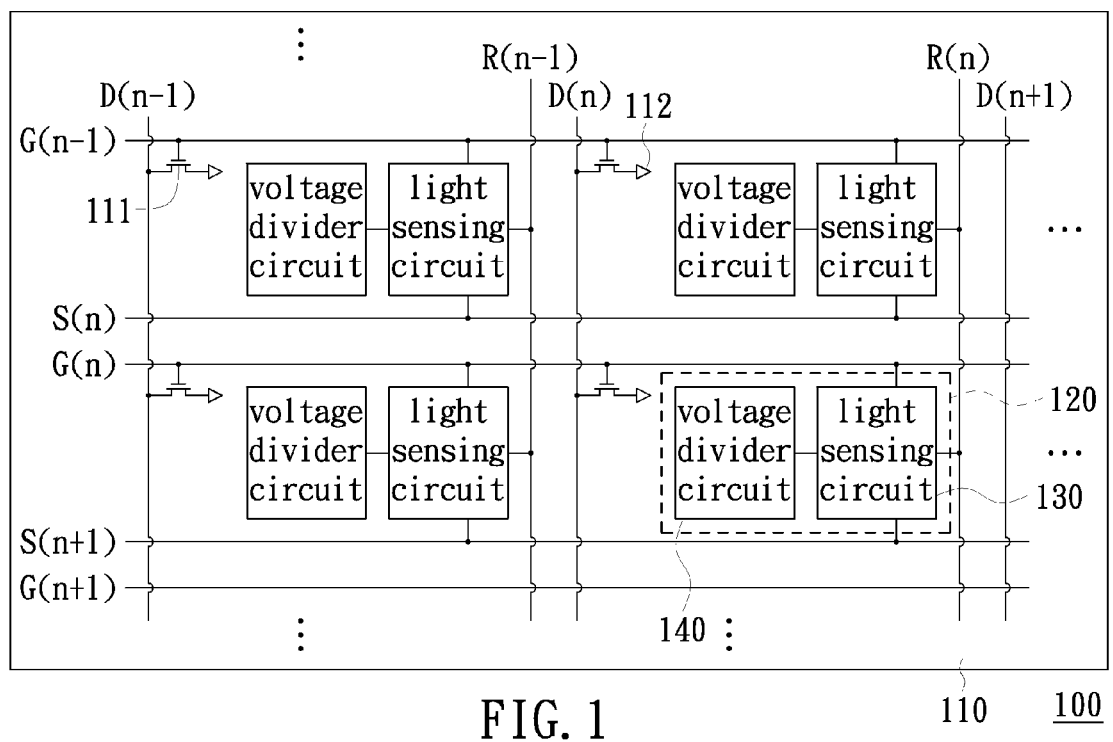
FIG. 1 is a schematic view of a display with touch function in accordance with an embodiment of the present disclosure.

FIG. 1 is a schematic view of a display with touch function in accordance with an embodiment of the present disclosure. As shown, the display 100 in this embodiment includes a substrate 110, another substrate (not shown) disposed correspondingly to the substrate 110, and a liquid crystal layer (not shown) disposed between the aforementioned two substrates. The display 100 further includes a plurality of scan lines (such as G(n−1), G(n) and G(n+1)) and a plurality of data lines (such as D(n−1), D(n) and D(n+1)) disposed on the substrate 110. These data lines and the scan lines are arranged in an intersecting manner and thereby a plurality of pixel areas are defined on the display 100. For example, four pixel areas are defined by arranging the scan lines G(n−1), G(n), G(n+1) and the data lines D(n−1), D(n) and D(n+1) in an intersecting manner. Each pixel area is disposed with a pixel transistor 111 and a pixel electrode 112. Specifically, the pixel transistor 111 is electrically coupled to a respective scan line and a respective data line; and the pixel electrode 112 is electrically coupled to a respective pixel transistor 111. The display 100 is configured to control the ON/OFF states of the pixel transistors 111 by transmitting specific scan signals thereto through the respective scan lines and transmit, while the pixel transistors 111 are in ON state, specific data signals to the pixel electrodes 112 through the respective data lines thereby displaying a specific image. The technical knowledge about the display 100 is well known by those ordinarily skilled in the art, and no redundant detail is to be given herein.

To implement the touch function into the display 100, the display 100 further includes one or more touch devices 120. Each touch device 120 includes a light sensing circuit 130, a voltage divider circuit 140, power line S(n), S(n+1) and readout lines R(n−1), R(n) all disposed on the substrate 110. Specifically, the light sensing circuit 130 is electrically coupled to respective power line S(n+1), scan line G(n) and readout line R(n). The voltage divider circuit 140 is electrically coupled to the light sensing circuit 130 and configured to output a first voltage to the light sensing circuit 130 through its output terminal according to a degree of illumination thereon or a degree of capacitance change therein. In this embodiment as illustrated in FIG. 1, every one of the pixel areas is exemplarily disposed with a touch device 120, and the readout line R(n−1), R(n) and the scan lines G(n−1), G(n), G(n+1) are arranged in an intersecting manner; however, the present invention is not limit thereto. In another embodiment, the touch function may also be realized if two or more adjacent pixel areas are corporately disposed with one touch device 120 only. In addition, it is to be noted that the display in the present disclosure may be referred to the liquid crystal display, organic light-emitting diode display, plasma display or electrophoretic display; and the present disclosure is not limited thereto.

Figure 2:
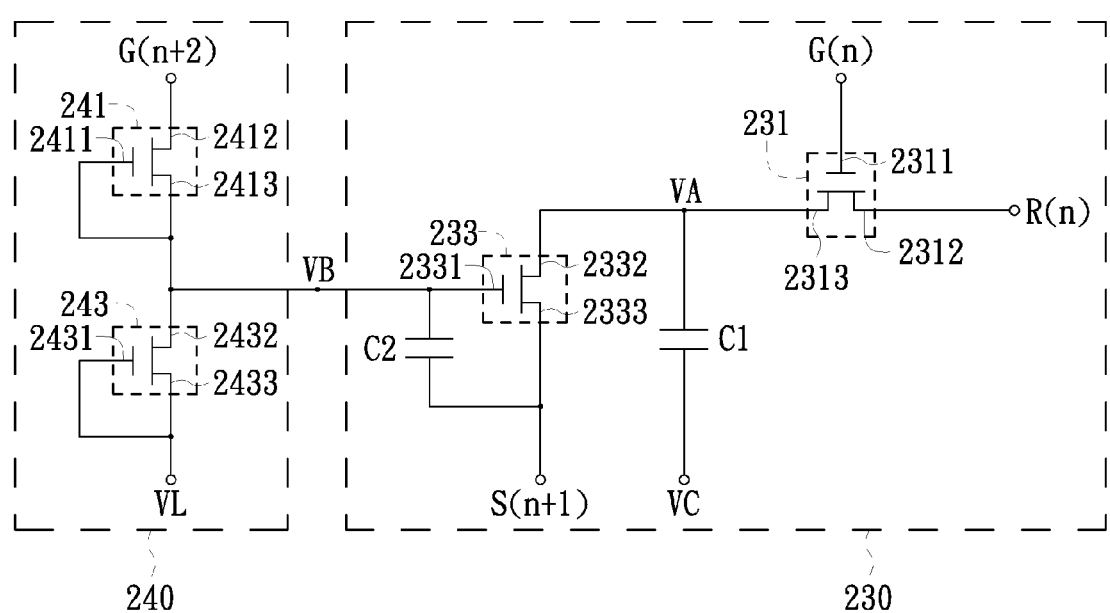
FIG. 2 is a schematic view of the internal circuit of the light sensing circuit and the voltage divider circuit shown in FIG. 1 in accordance with an embodiment of the present disclosure.

FIG. 2 is a schematic view of the internal circuit of the light sensing circuit 130 and the voltage divider circuit 140 shown in FIG. 1 in accordance with an embodiment of the present disclosure; wherein the light sensing circuit 230 and the voltage divider circuit 240 in FIG. 2 are equivalent to the light sensing circuit 130 and the voltage divider circuit 140 in FIG. 1, respectively. As shown, the light sensing circuit 230 includes a readout transistor 231, a light sensing transistor 233 (hereafter the light sensing transistor may refer to as a photo TFT) and two capacitors C1, C2. The readout transistor 231 is configured to have the gate terminal 2311 thereof (may also refer to the first control terminal) electrically coupled to the scan line G(n) and for controlling the ON/OFF state of the readout transistor 231; and the drain terminal 2312 thereof (may also refer to the first communication terminal) electrically coupled to the readout line R(n). The light sensing transistor 233 is configured to have the gate terminal 2331 thereof (may also refer to the second control terminal) electrically coupled to the output terminal of the voltage divider circuit 240 and from which to receive a first voltage VB; the drain terminal 2332 thereof (may also refer to the third communication terminal) electrically coupled to the source terminal 2313 (may also refer to the second communication terminal) of the readout transistor 231; and the source terminal 2333 thereof (may also refer to the fourth communication terminal) electrically coupled to the power line S(n+1). The capacitor C1 may be a voltage storage capacitor and configured to be electrically coupled between the source terminal 2313 of the readout transistor 231 and a constant voltage VC (for example, −5V). The capacitor C2 may be a coupling capacitor and configured to be electrically coupled between the gate terminal 2331 and the source terminal 2333 of the light sensing transistor 233. Specifically, when being operated in OFF state, the light sensing transistor 233 has a leakage current between the drain terminal 2332 and the source terminal 2333 thereof; wherein the degree of the generated leakage current corresponds to the illumination on the light sensing transistor 233.

The voltage divider circuit 240 includes a light sensing transistor 241 and a reference transistor 243. The light sensing transistor 241 is configured to have the gate terminal 2411 thereof (may also refer to the first control terminal) electrically coupled to the source terminal 2413 thereof (may also refer to the second communication terminal); the drain terminal 2412 thereof (may also refer to the first communication terminal) electrically coupled to the scan line G(n+2); and the source terminal 2413 thereof electrically coupled to the gate terminal 2331 of the light sensing transistor 233 and for being functioned as the output terminal of the voltage divider circuit 240 for outputting the first voltage VB. The reference transistor 243 is configured to have the gate 2431 thereof (may also refer to the second control terminal) electrically coupled to the source terminal 2433 thereof (may also refer to the fourth communication terminal); the drain terminal 2432 thereof (may also refer to the third communication terminal) electrically coupled to the source terminal 2413 of the light sensing transistor 241; and the source terminal 2433 thereof electrically coupled to a reference voltage VL (for example, −20V). It is understood that the scan line G(n+2) herein refers to the scan line next to the scan line G(n). Based on the same manner as described above, when being operated in OFF state, the light sensing transistor 241 has a leakage current between the drain terminal 2412 and the source terminal 2413 thereof; wherein the degree of the generated leakage current corresponds to the illumination on the light sensing transistor 241, and consequentially degree of the first voltage VB outputted from the output terminal of the voltage divider circuit 240 corresponds to the degree of the leakage current.

Figure 3:
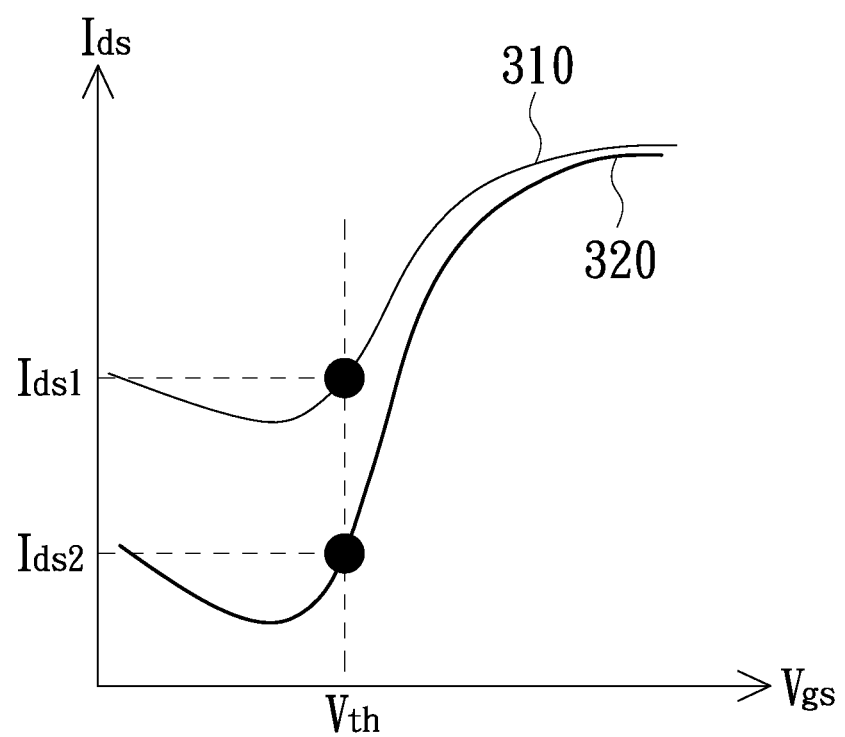
FIG. 3 is a schematic view illustrating the current-voltage characteristic curves of a light sensing transistor.

FIG. 3 is a schematic view illustrating the current-voltage characteristic curves of a light sensing transistor. In FIG. 3, the characteristic curve 310 is obtained when a light sensing transistor is on light (that is, being emitted by light); and the characteristic curve 320 is obtained when a light sensing transistor is off light (that is, not being emitted by light). Please refer to FIGS. 2 and 3 together. The light sensing transistor 233 is operated in OFF state by configuring the first voltage VB and the power line S(n+1) to result in a voltage difference, between the gate terminal 2331 and the source terminal 2333 (that is, Vgs), smaller than a threshold voltage Vth. Thus, as illustrated by the characteristic curve 310, a leakage current Ids1 is generated between the drain terminal 2332 and the source terminal 2333 of the light sensing transistor 233 when the light sensing transistor 233 is in OFF and on-light state; and as illustrated by the characteristic curve 320, a leakage current Ids2 is generated when the light sensing transistor 233 is in OFF and off-light light. In addition, when the light sensing transistor 233 is in OFF state and the readout transistor 231 is in ON state by a logic-high scan signal on the scan line G(n), a node voltage VA is transmitted to the readout line R(n) via the ON-state readout transistor 231; wherein the node voltage VA transmitted to the readout line R(n) will be readout by a readout circuit (not shown) in a next frame. It is to be noted that the node voltage VA in this embodiment is derived from the leakage current generated between the drain terminal 2332 and the source terminal 2333 of the light sensing transistor 233 and is generated by the charging or discharging of the leakage current on the capacitor C1; and accordingly, the node voltage VA corresponds to the leakage current. Thus, through the readout circuit determining the degree of the node voltage VA, the illumination degree (or, on light or off light) of the light sensing transistor 233 is determined and consequentially whether the pixel(s) associated with the light sensing transistor 233 is being touched by an object or not is determined. The means for the readout circuit to readout the node voltage VA so as to determine whether the pixel(s) associated with the light sensing transistor 233 is being touched by an object or not is a well-known technology and no redundant detail is to be given herein.

Similar, when being operated in OFF state, the light sensing transistor 241 in the voltage divider circuit 240 has a leakage current between the drain terminal 2412 and the source terminal 2413 thereof; wherein the degree of the generated leakage current corresponds to the illumination on the light sensing transistor 241 and consequentially the degree of the first voltage VB outputted from the output terminal of the voltage divider circuit 240 corresponds to the degree of the leakage current. Specifically, the light sensing transistor 241 has a leakage current Ids1 when being operated in OFF and on-light state as illustrated in FIG. 3; and accordingly, the light sensing transistor 233 has a smaller voltage difference, between the gate terminal 2331 and the source terminal 2333 (that is, Vgs). Alternatively, the light sensing transistor 241 has a leakage current Ids2 when being operated in OFF and off-light state as illustrated in FIG. 3; and accordingly, the light sensing transistor 233 has a larger voltage difference, between the gate terminal 2331 and the source terminal 2333. Thus, the light sensing transistor 233 in the light sensing circuit 230 has a more distinguishable Vgs between the on-light and off-light states, and accordingly the light sensing circuit 230 has a larger working window. Consequentially, the associated substrate and the display employing the aforementioned substrate can determine whether there has a touch event or not more accurately.

Figure 4:
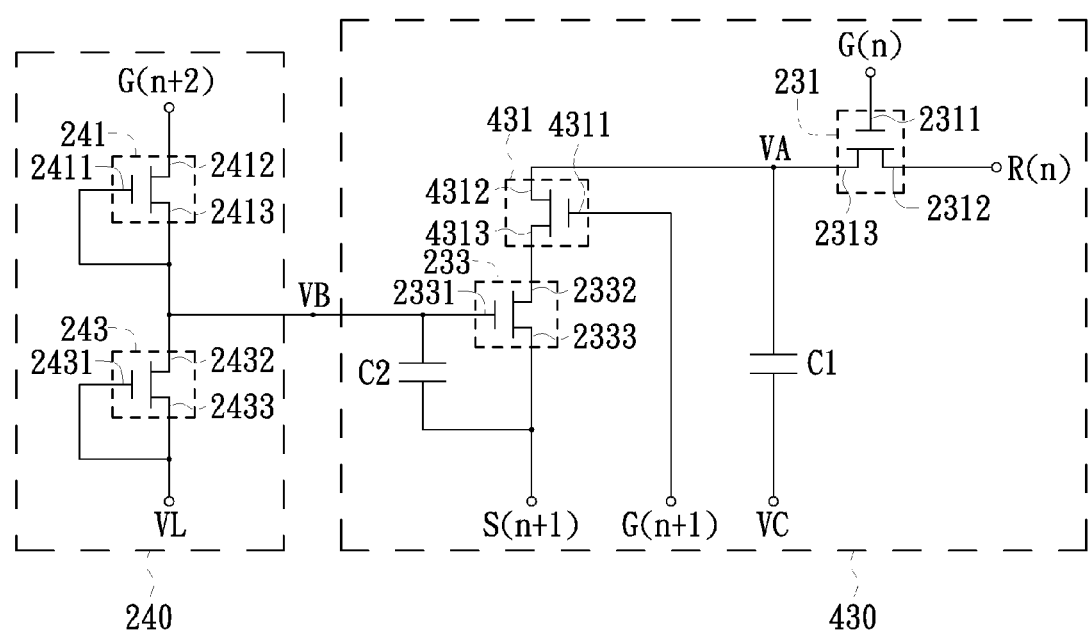
FIG. 4 is a schematic view of the internal circuit of the light sensing circuit and the voltage divider circuit shown in FIG. 1 in accordance with another embodiment of the present disclosure.

FIG. 4 is a schematic view of the internal circuit of the light sensing circuit 130 and the voltage divider circuit 140 shown in FIG. 1 in accordance with another embodiment of the present disclosure; wherein the light sensing circuit 430 and the voltage divider circuit 240 in FIG. 4 are equivalent to the light sensing circuit 130 and the voltage divider circuit 140 in FIG. 1, respectively. As shown, compared with the light sensing circuit 230 in FIG. 2, the light sensing circuit 430 in FIG. 4 further includes a light sensing transistor 431. The light sensing transistor 431 is configured to have the gate terminal 4311 thereof electrically coupled to the scan line G(n+1); the drain terminal 4312 thereof electrically coupled to the source terminal 2313 of the readout transistor 231; and the source terminal 4313 thereof electrically coupled to the drain terminal 2332 of the light sensing transistor 233. It is understood that the scan line G(n+1) herein refers to the scan line next to the scan line G(n). Through the aforementioned circuit configuration of the light sensing transistor 431, the light sensing transistor 430 is relatively insensitive to temperature.

Figure 5:
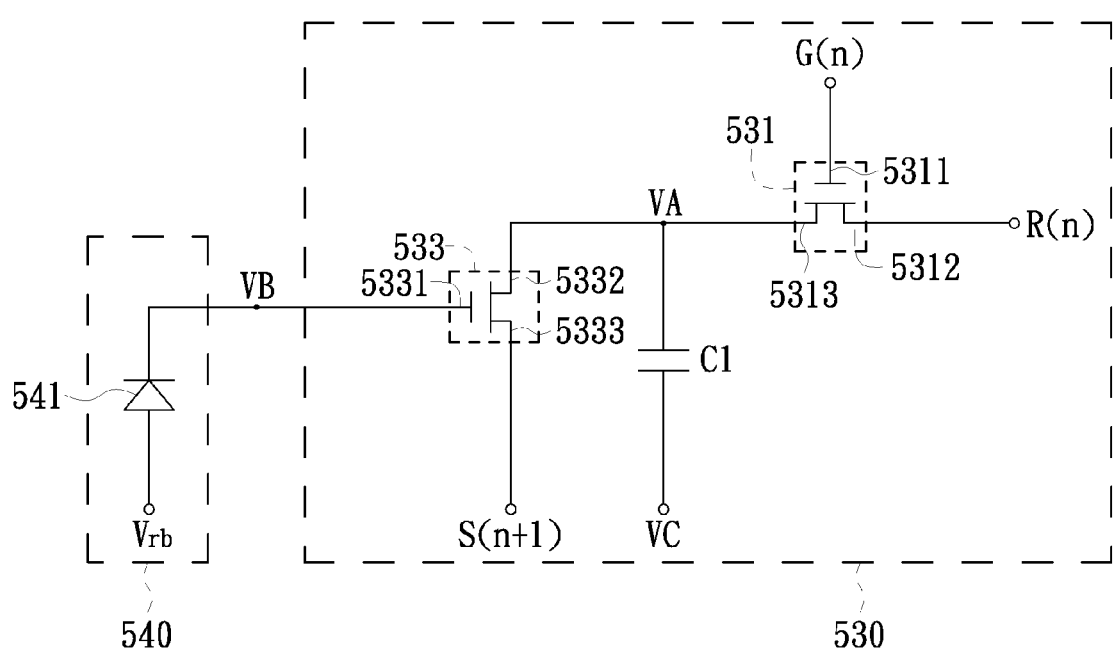
FIG. 5 is a schematic view of the internal circuit of the light sensing circuit and the voltage divider circuit shown in FIG. 1 in accordance with still another embodiment of the present disclosure.

FIG. 5 is a schematic view of the internal circuit of the light sensing circuit 130 and the voltage divider circuit 140 shown in FIG. 1 in accordance with still another embodiment of the present disclosure; wherein the light sensing circuit 530 and the voltage divider circuit 540 in FIG. 5 are equivalent to the light sensing circuit 130 and the voltage divider circuit 140 in FIG. 1, respectively. As shown, the light sensing circuit 530 in this embodiment includes a readout transistor 531, a light sensing transistor 533 and a capacitor C1. The readout transistor 531 is configured to have the gate terminal 5311 thereof (may also refer to the first control terminal) electrically coupled to the scan line G(n) and for controlling the ON/OFF state of the readout transistor 531; and the drain terminal 5312 thereof (may also refer to the first communication terminal) electrically coupled to the readout line R(n). The light sensing transistor 533 is configured to have the gate terminal 5331 thereof (may also refer to the second control terminal) electrically coupled to the output terminal of the voltage divider circuit 540 and from which to receive the first voltage VB; the drain terminal 5332 thereof (may also refer to the third communication terminal) electrically coupled to the source terminal 5313 (may also refer to the second communication terminal) of the readout transistor 531; and the source terminal 5333 thereof (may also refer to the fourth communication terminal) electrically coupled to the power line S(n+1). The capacitor C1 is configured to be electrically coupled between the source terminal 5313 of the readout transistor 531 and a constant voltage VC (for example, −5V). Specifically, when being operated in OFF state, the light sensing transistor 533 has a leakage current between the drain terminal 5332 and the source terminal 5333 thereof; wherein the degree of the generated leakage current corresponds to the illumination on the light sensing transistor 533.

As illustrated in FIG. 5, the voltage divider circuit 540 in this embodiment includes a light sensing diode 541, which is configured to have the anode terminal thereof electrically coupled to a reverse bias Vrb and the cathode terminal thereof electrically coupled to the gate terminal 5331 of the light sensing transistor 533; wherein cathode terminal of the light sensing diode 541 functions as an output terminal of the voltage divider circuit 540 for outputting the first voltage VB. Specifically, when being operated in OFF state, the light sensing diode 541 has a leakage current between the anode terminal and the cathode terminal thereof; wherein the degree of the generated leakage current corresponds to the illumination on the light sensing diode 541, and consequentially the degree of the first voltage VB outputted from the output terminal of the voltage divider circuit 540 corresponds to the degree of the leakage current.

It is to be noted that the components in the light sensing circuit 530 have a circuit structure similar to that in the light sensing circuit 230 shown in FIG. 2; thus, please refer to the description associated with the FIG. 2 for more detailed information and no redundant detail is to be given herein. Thus, because the first voltage VB corresponds to the illumination, the voltage difference between the drain terminal 5332 and the source terminal 5333 of the light sensing transistor 533 (that is, the Vgs) is more distinguishable between the on-light and off-light states, and accordingly the light sensing circuit 530 has a larger working window. Consequentially, the associated substrate and the display employing the aforementioned substrate can determine whether there has a touch event or not more accurately.

Figure 6:
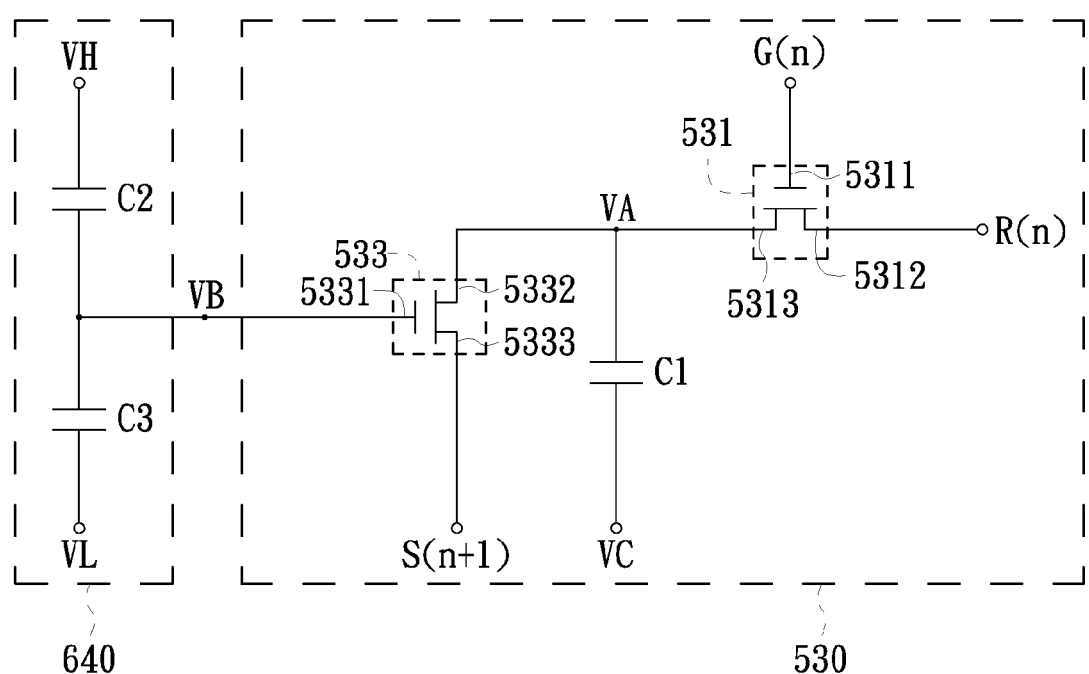
FIG. 6 is a schematic view of the internal circuit of the light sensing circuit and the voltage divider circuit shown in FIG. 1 in accordance with yet another embodiment of the present disclosure.

FIG. 6 is a schematic view of the internal circuit of the light sensing circuit 130 and the voltage divider circuit 140 shown in FIG. 1 in accordance with yet another embodiment of the present disclosure; wherein the light sensing circuit 530 and the voltage divider circuit 640 in FIG. 6 are equivalent to the light sensing circuit 130 and the voltage divider circuit 140 in FIG. 1, respectively. As shown, the voltage divider circuit 640 in this embodiment is implemented by two capacitors C2 and C3. The capacitor C2 may be a press capacitor and configured to be electrically coupled between the output terminal of the voltage divider circuit 640 and a predetermined voltage VH. The capacitor C3 may be a reference capacitor and configured to be electrically coupled between the output terminal of the voltage divider circuit 640 and a predetermined voltage VL; wherein the predetermined voltage VH is configured to be greater than the predetermined voltage VL. In this embodiment, the voltage divider circuit 640 is configured to output the first voltage VB when the touch device 120 (FIG. 1) is being touched by an object; wherein the degree of the first voltage VB corresponds to the press of the object on the touch device 120. Specifically, the capacitance of the capacitor C2 in the voltage divider circuit 640 increases with the aforementioned press, and consequentially the degree of the first voltage VB outputted from the output terminal of the voltage divider circuit 640 corresponds to the degree of the press. Because the first voltage VB corresponds to the press, the voltage difference between the drain terminal 5332 and the source terminal 5333 of the light sensing transistor 533 (that is, the Vgs) is more distinguishable, and accordingly the light sensing circuit 530 has a larger working window. Consequentially, the associated substrate and the display employing the aforementioned substrate can determine whether there has a touch event or not more accurately.

Figure 7:
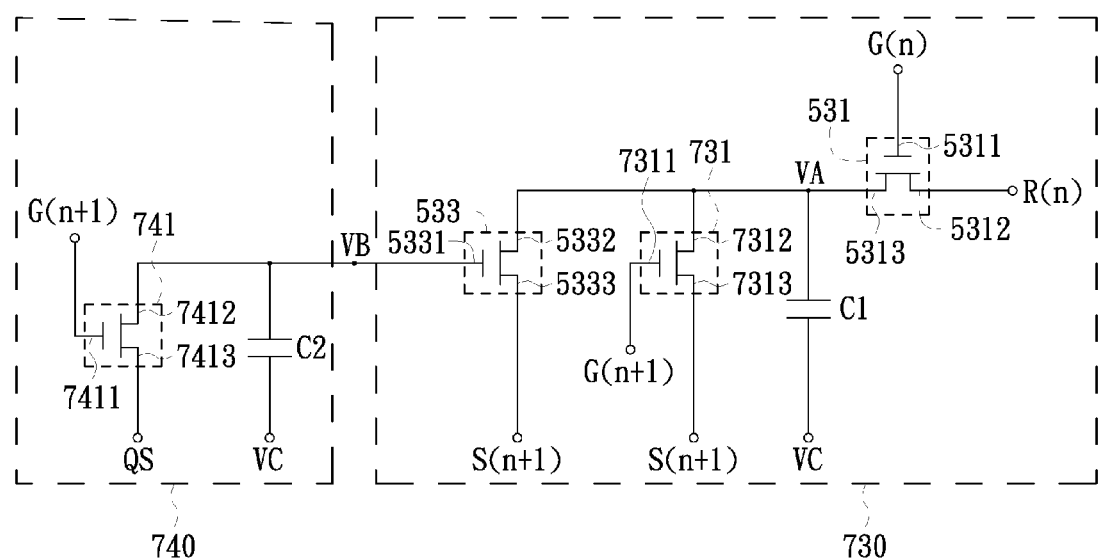
FIG. 7 is a schematic view of the internal circuit of the light sensing circuit and the voltage divider circuit shown in FIG. 1 in accordance with still yet another embodiment of the present disclosure.

FIG. 7 is a schematic view of the internal circuit of the light sensing circuit 130 and the voltage divider circuit 140 shown in FIG. 1 in accordance with still yet another embodiment of the present disclosure; wherein the light sensing circuit 730 and the voltage divider circuit 740 in FIG. 7 are equivalent to the light sensing circuit 130 and the voltage divider circuit 140 in FIG. 1, respectively. Compared with the light sensing circuit 530 and the voltage divider circuit 540 in FIG. 5, the light sensing circuit 730 in FIG. 7 further includes a reset transistor 731 and the voltage divider circuit 740 in FIG. 7 is implemented by a light sensing transistor 741 and a capacitor C2. In the light sensing circuit 730, the reset transistor 731 is configured to have the gate terminal 7311 thereof (may also refer to the third control terminal) electrically coupled to the scan line G(n+1); the drain terminal 7312 thereof (may also refer to the fifth communication terminal) electrically coupled to the source terminal 5313 of the readout transistor 531; and the source terminal 7313 thereof (may also refer to the sixth communication terminal) electrically coupled to the power line S(n+1).

In the voltage divider circuit 740, the light sensing transistor 741 is configured to have the gate terminal 7411 thereof (may also refer to the first control terminal) electrically coupled to the scan line G(n+1); the drain terminal 7412 thereof (may also refer to the first communication terminal) electrically coupled to the gate terminal 5331 of the light sensing transistor 533 and functioned as an output terminal of the voltage divider circuit 740 for outputting the first voltage VB; and the source terminal 7413 thereof (may also refer to the second communication terminal) for receiving a reverse signal QS relative to the scan signal on the scan line G(n+1). The capacitor C2 is configured to be electrically coupled between the drain terminal 7412 of the light sensing transistor 741 and a constant VC (for example, −5V). It is understood that the scan line G(n+1) herein is referred to as the scan line next to the scan line G(n). Similarly, when being operated in OFF state, the light sensing transistor 743 has a leakage current between the drain terminal 7412 and the source terminal 7413 thereof; wherein the degree of the generated leakage current corresponds to the illumination on the light sensing transistor 741, and consequentially the degree of the first voltage VB outputted from the output terminal of the voltage divider circuit 740 corresponds to the degree of the leakage current. Because the first voltage VB corresponds to the illumination, the voltage difference between the drain terminal 5332 and the source terminal 5333 of the light sensing transistor 533 (that is, the Vgs) is more distinguishable between the on-light and off-light states, and accordingly the light sensing circuit 730 has a larger working window. Consequentially, the associated substrate and the display employing the aforementioned substrate can determine whether there has a touch event or not more accurately.

In summary, by employing a voltage divider circuit on a substrate of a display with touch function, electrically coupling the voltage divider circuit with a light sensing circuit and configuring the voltage divider circuit to output a first voltage to the light sensing circuit according the degree of illumination thereon or a degree of associated capacitance change, the light sensing circuit has a larger working window. Consequentially, the substrate and the display employing the aforementioned substrate can determine whether there has a touch event or not more accurately.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:
1. A substrate with touch function, comprising:
  a plurality of scan lines disposed on the substrate;
  at least a touch device disposed on the substrate, the touch device comprising:
    at least a power line disposed on the substrate;
    at least a readout line disposed on the substrate;
    a light sensing circuit electrically coupled to a (N+1)th of the power lines, a Nth of the scan lines and a Nth of the readout lines, wherein N is an integer; and
    a voltage divider circuit comprising an output terminal and configured to output a voltage to the light sensing circuit through the output terminal thereof according to a degree of illumination thereon or a degree of capacitance change;
  wherein the light sensing circuit is controlled by a scan signal delivered through the Nth scan line and the voltage output from the voltage divider circuit, the light sensing circuit comprises:
    a readout transistor comprising a first control terminal, a first communication terminal and a second communication terminal, wherein the first control terminal is electrically coupled to the Nth of the scan lines, and the first communication terminal is electrically coupled to the Nth of the readout lines;

a first light sensing transistor comprising a second control terminal, a third communication terminal and a fourth communication terminal, wherein the second control terminal is electrically coupled to a (N+1)th of the scan lines, and the third communication terminal is electrically coupled to the second communication terminal;

a second light sensing transistor comprising a third control terminal, a fifth communication terminal and a sixth communication terminal, wherein the third control terminal is electrically coupled to the output terminal of the voltage divider circuit and for receiving the voltage, the fifth communication terminal is electrically coupled to the fourth communication terminal, and the sixth communication terminal is electrically coupled to the (N+1)th of the power lines;

a first capacitor electrically coupled between the third communication terminal and a constant voltage; and a second capacitor electrically coupled between the third control terminal and the sixth communication terminal;

wherein the (N+1)th of the scan lines is arranged next to the Nth of the scan lines.

2. The substrate according to claim 1, wherein the voltage divider circuit comprises:

a light sensing transistor comprising a first control terminal, a first communication terminal and a second communication terminal, wherein the first control terminal is electrically coupled to the second communication terminal, the first communication terminal is electrically coupled to a (N+2)th of the scan lines, and the second communication terminal is electrically coupled to the output terminal of the voltage divider circuit and for outputting the voltage; and a reference transistor comprising a second control terminal, a third communication terminal and a fourth communication terminal, wherein the second control terminal is electrically coupled to the fourth communication terminal, the third communication terminal is electrically coupled to the second communication terminal, and the fourth communication terminal is electrically coupled to a predetermined voltage;

wherein the (N+2)th of the scan lines is arranged next two scan lines from the Nth of the scan lines.

3. The substrate according to claim 1, wherein the voltage divider circuit comprises:

a light sensing diode comprising an anode terminal and a cathode terminal, wherein the anode terminal is electrically coupled to a reverse bias, and the cathode terminal is electrically coupled to the output terminal of the voltage divider circuit and for outputting the voltage.

4. The substrate according to claim 1, wherein the voltage divider circuit comprises:

a first capacitor electrically coupled between the output terminal of the voltage divider circuit and a first predetermined voltage; and a second capacitor electrically coupled between the output terminal of the voltage divider circuit and a second predetermined voltage;

wherein the first predetermined voltage is greater than the second predetermined voltage, and the voltage divider circuit is configured to output a corresponding degree of the voltage according to a degree of capacitance change of the first capacitor.

5. The substrate according to claim 1, wherein the voltage divider circuit comprises:

a light sensing transistor comprising a first control terminal, a first communication terminal and a second communication terminal, wherein the first control terminal is electrically coupled to a (N+1)th of the scan lines, the first communication terminal is electrically coupled to the output terminal of the voltage divider circuit, and the second communication terminal is for receiving an inverse signal of a scan signal on the (N+1)th of the scan lines; and a capacitor electrically coupled between the first communication terminal and a constant voltage;

wherein the (N+1)th of the scan lines is arrange next to the Nth of the scan lines.

6. A substrate with touch function, comprising:

a plurality of scan lines disposed on the substrate;

at least a touch device disposed on the substrate, the touch device comprising:

at least a power line disposed on the substrate;

at least a readout line disposed on the substrate;

a light sensing circuit electrically coupled to a (N+1)th of the power lines, a Nth of the scan lines and a Nth of the readout lines, wherein N is an integer; and a voltage divider circuit comprising an output terminal and configured to output a voltage to the light sensing circuit through the output terminal thereof according to a degree of illumination thereon or a degree of capacitance change;

wherein the light sensing circuit is controlled by a scan signal delivered through the Nth scan line and the voltage output from the voltage divider circuit, the light sensing circuit comprises:

a readout transistor comprising a first control terminal, a first communication terminal and a second communication terminal, wherein the first control terminal is electrically coupled to the Nth of the scan lines, and the first communication terminal is electrically coupled to the Nth of the readout lines;

a light sensing transistor comprising a second control terminal, a third communication terminal and a fourth communication terminal, wherein the second control terminal is electrically coupled to the output terminal of the voltage divider circuit and for receiving the first voltage, the third communication terminal is electrically coupled to the second communication terminal, and the fourth communication terminal is electrically coupled to the (N+1)th of the power lines; and a capacitor electrically coupled between the second communication terminal and a constant voltage.

7. The substrate according to claim 6, wherein the voltage divider circuit comprises:

a light sensing transistor comprising a first control terminal, a first communication terminal and a second communication terminal, wherein the first control terminal is electrically coupled to the second communication terminal, the first communication terminal is electrically coupled to a (N+2)th of the scan lines, and the second communication terminal is electrically coupled to the output terminal of the voltage divider circuit and for outputting the voltage; and a reference transistor comprising a second control terminal, a third communication terminal and a fourth communication terminal, wherein the second control terminal is electrically coupled to the fourth communication terminal, the third communication terminal is electrically coupled to the second communication terminal, and the fourth communication terminal is electrically coupled to a predetermined voltage;

wherein the (N+2)th of the scan lines is arranged next two scan lines from the Nth of the scan lines.

8. The substrate according to claim 6, wherein the voltage divider circuit comprises:
a light sensing diode comprising an anode terminal and a cathode terminal, wherein the anode terminal is electrically coupled to a reverse bias, and the cathode terminal is electrically coupled to the output terminal of the voltage divider circuit and for outputting the voltage.

9. The substrate according to claim 6, wherein the voltage divider circuit comprises:
a first capacitor electrically coupled between the output terminal of the voltage divider circuit and a first predetermined voltage; and
a second capacitor electrically coupled between the output terminal of the voltage divider circuit and a second predetermined voltage;
wherein the first predetermined voltage is greater than the second predetermined voltage, and the voltage divider circuit is configured to output a corresponding degree of the voltage according to a degree of capacitance change of the first capacitor.

10. The substrate according to claim 6, wherein the voltage divider circuit comprises:
a light sensing transistor comprising a first control terminal, a first communication terminal and a second communication terminal, wherein the first control terminal is electrically coupled to a (N+1)th of the scan lines, the first communication terminal is electrically coupled to the output terminal of the voltage divider circuit, and the second communication terminal is for receiving an inverse signal of a scan signal on the (N+1)th of the scan lines; and
a capacitor electrically coupled between the first communication terminal and a constant voltage;
wherein the (N+1)th of the scan lines is arrange next to the Nth of the scan lines.

11. A substrate with touch function, comprising:
a plurality of scan lines disposed on the substrate;
at least a touch device disposed on the substrate, the touch device comprising:
at least a power line disposed on the substrate;
at least a readout line disposed on the substrate;
a light sensing circuit electrically coupled to a (N+1)th of the power lines, a Nth of the scan lines and a Nth of the readout lines, wherein N is an integer; and
a voltage divider circuit comprising an output terminal and configured to output a voltage to the light sensing circuit through the output terminal thereof according to a degree of illumination thereon or a degree of capacitance change;
wherein the light sensing circuit is controlled by a scan signal delivered through the Nth scan line and the voltage output from the voltage divider circuit, the light sensing circuit comprises:
a readout transistor comprising a first control terminal, a first communication terminal and a second communication terminal, wherein the first control terminal is electrically coupled to the Nth of the scan lines, and the first communication terminal is electrically coupled to the Nth of the readout lines;
a light sensing transistor comprising a second control terminal, a third communication terminal and a fourth communication terminal, wherein the second control terminal is electrically coupled to the output terminal of the voltage divider circuit and for receiving the voltage, the third communication terminal is electrically coupled to the second communication terminal, and the fourth communication terminal is electrically coupled to the (N+1)th of the power lines;
a reset transistor comprising a third control terminal, a fifth communication terminal and a sixth communication terminal, wherein the third control terminal is electrically coupled to a (N+1)th of the scan lines, the fifth communication terminal is electrically coupled to the second communication terminal, and the sixth communication terminal is electrically coupled to the (N+1)th of the power lines; and
a capacitor electrically coupled between the second communication terminal and a constant voltage.

12. The substrate according to claim 11, wherein the voltage divider circuit comprises:
a light sensing transistor comprising a first control terminal, a first communication terminal and a second communication terminal, wherein the first control terminal is electrically coupled to the second communication terminal, the first communication terminal is electrically coupled to a (N+2)th of the scan lines, and the second communication terminal is electrically coupled to the output terminal of the voltage divider circuit and for outputting the voltage; and
a reference transistor comprising a second control terminal, a third communication terminal and a fourth communication terminal, wherein the second control terminal is electrically coupled to the fourth communication terminal, the third communication terminal is electrically coupled to the second communication terminal, and the fourth communication terminal is electrically coupled to a predetermined voltage;
wherein the (N+2)th of the scan lines is arranged next to the Nth of the scan lines.

13. The substrate according to claim 11, wherein the voltage divider circuit comprises:
a light sensing diode comprising an anode terminal and a cathode terminal, wherein the anode terminal is electrically coupled to a reverse bias, and the cathode terminal is electrically coupled to the output terminal of the voltage divider circuit and for outputting the voltage.

14. The substrate according to claim 11, wherein the voltage divider circuit comprises:
a first capacitor electrically coupled between the output terminal of the voltage divider circuit and a first predetermined voltage; and
a second capacitor electrically coupled between the output terminal of the voltage divider circuit and a second predetermined voltage;
wherein the first predetermined voltage is greater than the second predetermined voltage, and the voltage divider circuit is configured to output a corresponding degree of the voltage according to a degree of capacitance change of the first capacitor.

15. The substrate according to claim 11, wherein the voltage divider circuit comprises:
a light sensing transistor comprising a first control terminal, a first communication terminal and a second communication terminal, wherein the first control terminal is electrically coupled to a (N+1)th of the scan lines, the first communication terminal is electrically coupled to the output terminal of the voltage divider circuit, and the second communication terminal is for receiving an inverse signal of a scan signal on the (N+1)th of the scan lines; and a capacitor electrically coupled between the first communication terminal and a constant voltage;
wherein the (N+1)th of the scan lines is arrange next to the Nth of the scan lines.

\* \* \* \* \*